United States Patent [19]
Engel et al.

[11] 3,753,071
[45] Aug. 14, 1973

[54] LOW COST TRANSISTORIZED INVERTER
[75] Inventors: Joseph C. Engel, Monroeville;
Robert T. Elms, Pittsburgh, both of Pa.
[73] Assignee: Westinghouse Electric Corporation, Pittsburgh, Pa.
[22] Filed: June 15, 1972
[21] Appl. No.: 263,041

[52] U.S. Cl............... 321/2, 315/DIG. 7, 321/45 R
[51] Int. Cl. ............................................. H02m 5/44
[58] Field of Search................. 315/DIG. 2, DIG. 4, 315/DIG. 7; 321/45 R

[56] References Cited
UNITED STATES PATENTS
| | | | |
|---|---|---|---|
| 3,447,064 | 5/1969 | Moury............................ | 321/45 R X |
| 3,448,368 | 6/1969 | Brouwer......................... | 321/45 R X |
| 3,558,915 | 1/1971 | Wood.............................. | 321/45 R |
| 3,566,148 | 2/1971 | Wood.............................. | 321/45 R |
| 3,617,857 | 11/1971 | Gunderson...................... | 321/45 R |

FOREIGN PATENTS OR APPLICATIONS
| | | | |
|---|---|---|---|
| 217,513 | 5/1968 | U.S.S.R............................ | 321/45 R |

*Primary Examiner*—William M. Shoop, Jr.
*Attorney*—A. T. Stratton et al.

[57] ABSTRACT

Low cost circuit for operation of discharge lamps utilizing a rectifier and a two-transistor inverter to provide high-frequency operation of ballasted discharge lamps from a relatively low frequency power source. An air-core feedback transformer is used to provide high frequency operation of the inverter and voltage-shift-initiated feedback is used to prevent "shoot-through" of the two-transistor inverter. Preferably there is, in series with the load, a series resonant combination having a resonant frequency higher than the inverter frequency, in order to minimize switching losses in the transistor inverter.

9 Claims, 5 Drawing Figures

LOW COST TRANSISTORIZED INVERTER

CROSS REFERENCE TO RELATED APPLICATION

In copending application Ser. No. 263,040, filed concurrently herewith and now allowed, by Robert T. Elms, and owned by the present assignee, is disclosed a dual-input-voltage, three-terminal-output rectifier for use in combination with a two-transistor inverter. The present circuit arrangement can be used in conjunction with the combination of this copending application.

BACKGROUND OF THE INVENTION

The usual commercial lighting discharge devices, such as the fluorescent lamp and the high pressure mercury vapor lamp, can be characterized as negative resistance devices. In practice, relatively heavy and expensive reactive current limiting devices are generally utilized in series with discharge devices to stabilize the discharge devices.

It has been recognized that the low pressure mercury discharge fluorescent lamp device, as well as the high pressure mercury discharge device, can be operated efficiently at high frequencies and that at these frequencies smaller, less expensive, reactive current limiting devices can be used in series with the discharge device. Rectifiers have been utilized to convert the low frequency alternating current of a power source into direct current and two-transistor inverters utilized to convert this direct current into high frequency AC power for the discharge device. The "Westinghouse Silicon Power Transistor Handbook" published by Westinghouse Electric Corporation in 1967, shows an iron-core transformer feedback in FIG. 5.1 and an oscillator driven inverter in FIG. 5.6.

While such arrangements provide for efficient operation of the discharge device, problems have been encountered. When the normal type of transformer (iron-core) is used as a feedback device to control switching of the transistors in the inverter, the inverter frequency is limited to a maximum of approximately 10 kHz, which limits the advantages of high frequency operation. This type circuit can also lead to the generation of audible noise.

Higher frequency operation may be obtained by driving the switching of the inverter transistors from an independent oscillator. In the common configuration, where the two transistors are in series directly across the rectifier output catastrophic "shoot-through" or "switch-through" can result, as one transistor can be turned on while the storage current is still holding the other transistor on. Both the transistors being on at the same time will provide a direct short across the output of the rectifier resulting in component failure. Shoot-through has also occurred in normal (iron-core) transformer feedback circuit, probably because the close coupling allows significant coupling of the current reversal (from the secondary of the one transistor starting to turn off) into the other secondary and this tends to turn on the second transistor.

SUMMARY OF THE INVENTION

The present invention presents a circuit for high-frequency operation of discharge lamps which provides for operation at frequencies of 17 kHz or more, and provides protection against "shoot-through."

The circuit can, for purposes of analysis, be divided into sections. These sections are the rectifier means, the inverter means, and the load. A fourth section, the isolation means is preferably included as well.

The rectifier means has an electrically positive terminal and an electrically negative terminal, and input terminals adapted to be connected to an AC power source.

The inverter means comprises first and second transistors (the more general terminology solid state switch will be used hereinafter) connected in series relationship between the positive and negative output terminals. Each solid state switch has a collector, a base and an emitter (transistor lead designation is used for convenience, however this designation is intended to include analogous leads of other solid state switches). The first solid-state switch is connected to the positive rectifier terminal and the second solid state switch is connected to the negative rectifier terminal. The inverter output junction is provided by the junction connection of the first solid state switch and the second solid state switch.

The inverter also has a feedback means for switching the solid state switches. The feedback means of the present invention comprises an air-core transformer and a resistor. The resistor is connected in series with the primary winding of the air-core transformer and this series combination is connected effectively in parallel with the load. A first secondary winding is connected between the base and the emitter of the first solid state switch. The windings of this secondary being "polarized" (wound in such a manner as to cause a current in the proper direction) to turn on the first solid state switch when the voltage across the primary winding (at the inverter output junction) has a positive shift in voltage. The second secondary is connected between the base and the emitter of the second solid state switch. This second secondary is polarized so as to turn on the second solid state switch when the inverter output junction has a negative shift in voltage. The inherent decay in the current in the secondaries allows the turned on solid state switch to be turned off after a short period of time (about 16 to 29 microseconds), this turn off inducing a shift in voltage which causes turn on of the other solid state switch, thereby causing oscillation.

The electric load comprises a series combination of at least one reactive electrical component (ballast) and a discharge lamp.

Preferably an isolating means is used and is connected in one of two manners. It may be connected in series with the load, the the series combination of the isolating means and load connected between the inverter output junction and at least one of the rectifier positive and negative output terminals. Alternately it may be connected between said positive and negative output terminals of the rectifier so as to provide a midpoint terminal, this midpoint terminal having a voltage which is substantially the midpoint between the positive and negative output terminals, and the load is connected between the inverter output junctions and the midpoint terminal.

If the load is connected between the output junction and either the positive or negative rectifier terminal without an isolation means, pulsating DC, rather than AC, will be supplied to the load. Although discharge lamps will function on pulsating DC, it is preferable that such lamps be operated from AC. The isolation means, for example a large capacitor, provides a shift in voltage to change the pulsating DC into AC.

The use of an air-core transformer feedback in the manner of the present invention allows high-frequency operation of the inverter and the use of the primary of this air-core transformer in series with a resistor provides a feedback initiated by a shift in voltage of the inverter output terminal. Turn-on for one solid state switch is provided, not when the other solid state switch receives a turn-off signal, but when the other solid state switch actually turns off. Thus a delay in turn-off after the turn-off signal is received will not result in both solid-state switches being on at the same time and shoot-through is prevented.

BRIEF DESCRIPTION OF THE DRAWINGS

A better understanding of the invention will be obtained from the exemplary embodiments shown in the accompanying drawings, wherein.

DESCRIPTION OF THE PREFERRED EMBODIMENTS

Figure 1:
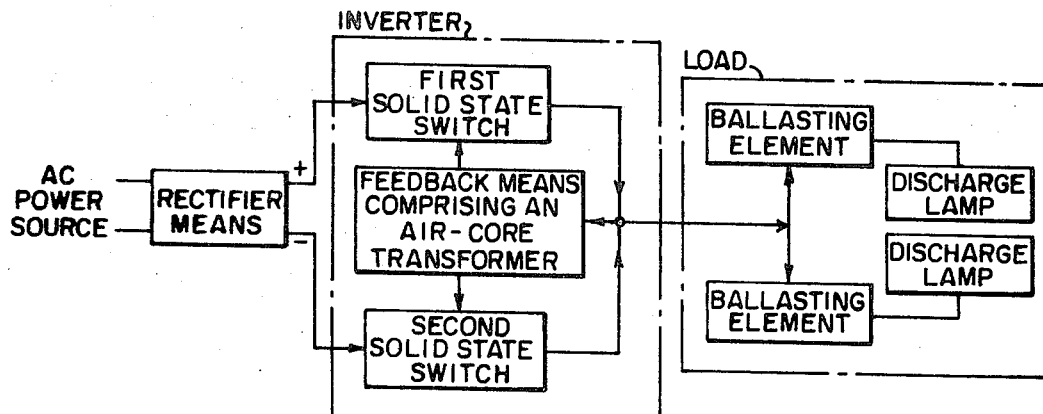
FIG. 1 is a block diagram outlining the general system.

As shown in FIG. 1 a rectifier means feeds power to a high-frequency inverter. The inverter comprises two solid state switches, and a feedback means comprising an air-core transformer. A starting means may also be included as higher power inverters, unlike most oscillators, typically are not self-starting. Thus a starting means connected between the base and the emitter of one of the solid state switches is often required to trigger operation. The inverter feeds power to the electrical load. The load can comprise one or more discharge lamps (FIG. 1 shows two) each with its own reactive ballasting element in series. Because of the high frequency, relatively small reactive elements can be used.

The circuit comprises a rectifier means, first and second solid state switches, a junction connected to the common connection between the solid state switches, and a feedback means. The transformer means has a positive and a negative terminal, and the first and second solid state switches are connected in series directly across the positive and negative terminals, with the first solid-state switch connected to the positive terminal and the second solid-state switch connected to the negative terminal. The junction is connected to the common connection between the first and second solid state switches, and is adapted to be connected to the load to transfer high-frequency power thereto. The feedback means comprises a resistor and an air-core transformer. The air-core transofrmer has a primary winding and first and second secondary windings. The resistor and the primary winding are connected in series, and the series-connectd resistor and primary winding are connected effectively in parallel with the load, with a voltage shift at the junction producing a change in current in the primary winding. The first secondary is connected to the first solid state switch. A change in current in the primary winding on a positive shift in voltage at the junction provides in the first secondary winding an electrical signal which rapidly decays. This signal in the first secondary first turns on the first solid state switch and then turns off the first solid state switch, the turn-off of the first solid state switch producing a negative shift in voltage at the junction. The second secondary is connected to the second solid state switch. A change in current in the primary winding on the negative shift in voltage at the junction provides in the second secondary winding an electrical signal which rapidly decays. This signal in the second secondary first turns on the second solid state switch and then turns off the second solid state switch, the turn-off of the second solid state switch producing a positive shift in voltage at the junction to continue the inverter action, and the rapid decays in electrical signals in the secondary windings providing high-frequency operation pulsating.

An isolation means is preferably used to provide AC, rather than pulsating DC to the load. The isolation means is typically one or more capacitors. The isolation means can be placed either between the rectifier means and the load or between the inverter output terminal and the load. With either configuration, the return lead can go to either the positive or the negative terminal of the rectifier means. Alternately, in place of the isolation capacitor, an isolation transformer could be used to convert the pulsating DC into AC.

Figure 2:
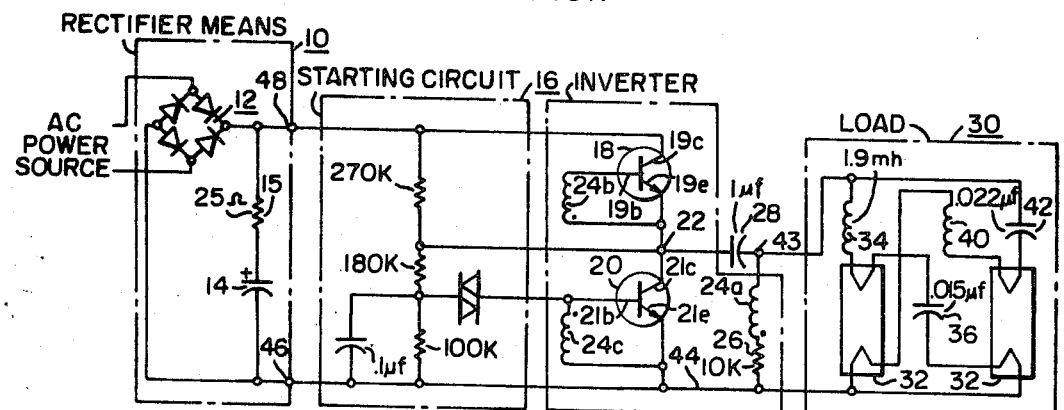
FIG. 2 is a schematic of a specific embodiment in which a single capacitor serves as the isolation means.

As illustrated in FIG. 2, the rectifying means 10 can comprise a full wave bridge 12 and a filter capacitor 14. An in-rush limiting thermistor 15 is preferably used to limit current in-rush into the uncharged capacitor 14 on startup. The high-frequency inverter can comprise a starting circuit 16, a first solid state switch 18 with base 19b, collector 19c, and emitter 19e, a second solid state swithc 20 with base 21b, collector 21c, and emitter 21e, an inverter output junction 22, and a feedback means comprising an air-core transformer with a primary 24a, a first secondary 24b, and a second secondary 24c and a resistor 26. The isolating means 28 is a single capacitor in this configuration. The laod 30 comprises a fisrt discharge lamp 32 with a series inductor 34. When voltage is first applied, the first lamp starting capacitor 36 together with the series inductor 34 provide a series resonant circuit which impresses a high voltage across the first discharge lamp 32 to start the lamp. When the first discharge lamp 32 is conducting, the lamp looks like a low resistance in parallel with the first lamp starting capacitor 36, and the capacitor 36 no longer has any significant effect on the circuit, and the first discharge lamp 32 operates in an inductively ballasted manner. The second discharge lamp 38 operates in a somewhat similar manner, being started by second lamp starting inductor 40 and then operating in a capacitively ballasted manner due to series capacitor 42. A first discharge lamp 32 and its series inductor 34 look inductive, and the second discharge lamp 38 with its series capacitor 42 looks capacitive, the load 30 as a whole can be made to look approximately resistive, thus minimizing the inverter currents and allowing either smaller first and second solid state switches 18, 20 or additional discharge lamps to be included in the load.

The isolation means 28 is connected between the circuit output terminal 43 and either the inverter output junction 22 or at least one of the rectifier output terminals.

In FIG. 2 the isolation means 28 is shown on the inverter output junction 22 side of the load 30 and the return lead 44 is shown connected to the negative output terminal 46 of the rectifier means 10, however, the isolation means 28 could also be placed on the return lead 44 side of the load. In either configuration, the return lead 44 could alternately be connected to the positive output terminal 48. The isolation means 28, as was noted earlier, is typically a relatively large capacitor (for example 350 microfarads), and presents negligible impedance to the flow of current at these frequencies. The capacitor functions solely to provide voltage isolation, effectively shifting the baseline to change the inverter's pulsating DC into AC for the load.

The arrangement of the filaments of the lamps in FIG. 2 provides a safety interlock such that both resonant circuits will be interrupted if either lamp is removed, minimizing the exposure of maintenance personnel to the high voltage which can occur in a series resonant circuit.

Figure 3:
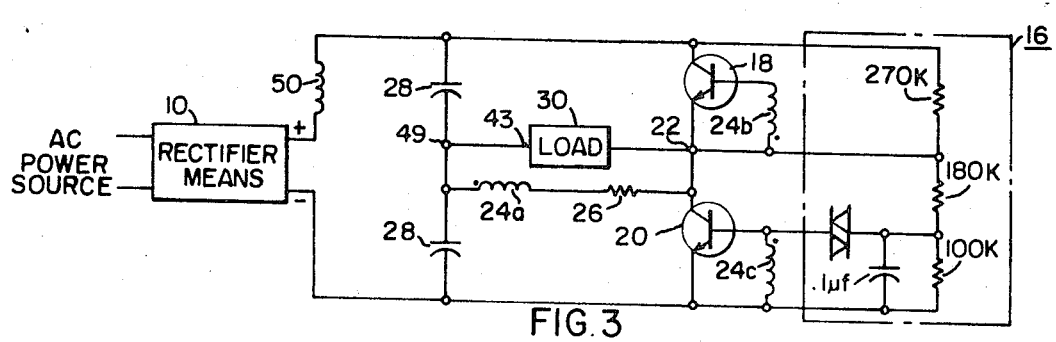
FIG. 3 illustrates an alternate embodiment of the isolation means in which the isolation means comprises two capacitors.

In FIG. 3, the isolation means 28 comprises two capacitors rather than one. These capacitors are connected in series between the positive terminal 48 and the negative terminal 46 of the rectifier. One terminal of the load is connected to the common connection point of the two capacitors and the other terminal of the load is connected to the inverter output junction 22. In the combination of the present invention the capacitors serve not only as isolation means 28, but also as filter capacitor for the rectifier means 10. It will be noted that 200 volt capacitors can be used with a 220 or 278 volt rms power source in this configuration, while with such a power source 200 volt capacitors cannot be used for the filter capacitor 14 in the configuration shown in FIG. 2. When isolation means 28, such as two large capacitors, is connected between the positive and negative terminals 46, 48 of the rectifier a midpoint terminal 49 is provided and the voltage of this midpoint terminal is substantially the midpoint between the positive and negative terminals. The load is connected between the inverter output junction and this midpoint terminal 49 and sees AC which is approximately a square wave whose peak to peak voltage is approximately the rectifier output voltage. This combination of rectifier means 10, isolation means 28 and midpoint terminal could be considered a three-output-terminal rectifier. Any other type of three-output-terminal rectifier, having a midpoint between the positive and negative terminal can also be used.

In a configuration such as FIG. 3 is is preferable to use an in-rush limiting device such as the inrush limiting inductor 50 to prevent a large current surge on start-up, when the capacitors are uncharged. The inrush limiting inductor 50 can be in either of the lines of the power source or in either the positive or negative lead of the rectifier means 10.

As an alternative to using a single reactive device in series to ballast each discharge lamp as was shown in FIG. 2 (where the only ballasting device in series would be first discharge lamp 32 was the series inductor 34 and the only ballasting device in series with the second discharge lamp 38 with the series capacitor 42 — the isolation means 28, as was previously noted, is a quite large capacitor and has no significant effect on the current and therefore does not act as a ballasting device), the present invention preferably uses a resonant ballast made up of a series combination of two reactive devices (a capacitor and an inductor) to ballast the lamp. Preferably, the resonant frequency of the capacitor and the inductor is higher than the frequency of the inverter (the frequency at which the first and a second solid state switches 18, 20 oscillate) and thus, during each half-cycle, the current in the lamps will fall to a low level before the solid state switch which is conducting is switched off. This provides reduced switching losses in the solid state switches 18, 20. As losses in solid state switches are very low when the switch is fully on or fully off, but are approximately equal to the voltage across the solid state switch times the current through the solid state switch during the transition time, it can be seen that switching losses are generally the greatest losses and reducing the current to the solid state switches during their transition will reduce switching losses. As there is series impedance which limits the current during turn-on switching, the turn-off losses are generally the major switching losses. Thus the series resonant ballast by minimizing of the current during turn-off time, minimizes what is normally the major contribution to losses. The use of a 30 kHz series resonance ballast with a 20 kHz inverter has proven satisfactory and was found to reduce transistor losses from about 16 watts for 200 watts of lighting in an arrangement such as in FIG. 2 to about 4 watts in the resonant ballast arrangement.

Figures 4, 5:
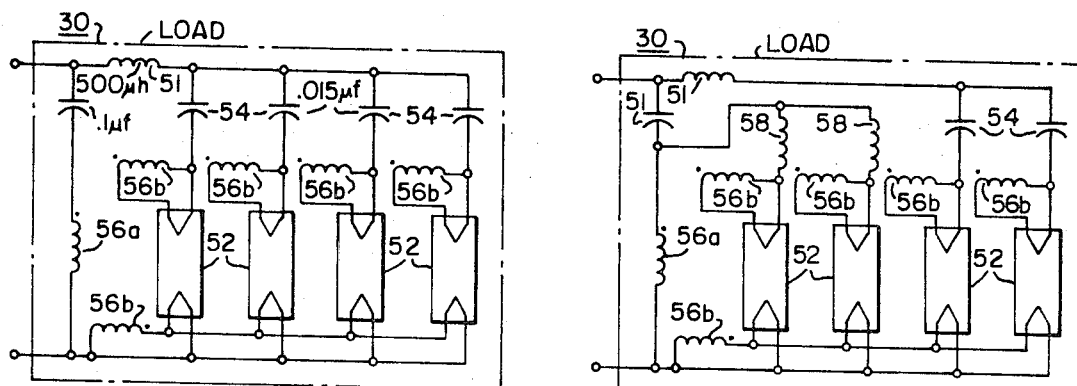
FIG. 4 is a schematic of a load configuration utilizing a single major reactive element in series with several load segments, and also utilizing an air-core filament transformer to deliver power to fluorescent lamp filaments.
FIG. 5 is a schematic of an alternate load configuration utilizing two major reactive elements, each of which is in series with two load segments.

FIG. 4 illustrates one type of resonant ballast configuration for the load 30. In this configuration, there is effectively a capacitor and an inductor in series with each lamp which is achieved by the use of a major reactive element 51 in series with a parallel combination of (at least two, and here, four) load segments, each load segment comprising a discharge lamp 52 and a reactive component of the opposite type of the major reactive element 51 (here capactiros 54 are used in the load segments as the major reactive element 51 here is an inductor). Although one of the series reactive elements can be used for several lamps, each lamp must also have an individual element in series as the resistances of two lamps are generally not exactly the same and the brightness of the two could easily be noticeably different if two lamps were placed directly in parallel. There is also shown in FIG. 4 an air-core filament transformer with a primary 56a and secondaries 56b, which secondaries 56b power the filaments of the fluorescent lamps 52. The primary of the air-core filament transformer 56a is connected effectively in parallel with the load 30. A filament transformer with an air-core can be used conveniently at these frequencies (17 to 30 kHz). The use of a filament transformer arrangement to preheat (rather than high-voltage instant striking as in the FIG. 2 arrangement) minimizes end blackening and premature decrease in lumen maintenance.

An alternate configuration for the load 30 is shown in FIG. 5. This illustrates the use of more than one load major portion. Each load portion comprises a major reactive element 51 in series with a parallel combination of (two or more) load segments. Each load segment comprises a discharge lamp 52 and a reactive component in that load portion. A capacitor 54 is used when the major reactive element 51 is inductive and an inductor 58 is used when the major reactive element 51 is capacitive. Using more than one major load portion can maximize utilization of solid state current capacity. The use of one load portion which is preponderantly inductive and another laod portion which is preponderantly capacitive can make the laod as a whole approximately resistive and minimized currents in the solid state switches. Although switching losses are somewhat higher in the FIG. 5 configuration than in an arrangement such as in FIG. 4, more lamps can be supplied from given current capacity solid state switches.

Although the lamps in FIGS. 4 and 5 have been illustrated as fluorescent lamps, it is clear to one skilled in the art that other discharge lamps can be used in similar configurations.

Referring again to FIG. 2, it can be noted that the feedback device of this invention causes the inverter action. Generally, the solid state switches are held on for a short period of time by the intially positive feedback, and then turned off when the feedback becomes negative (the decay of the feedback will be discussed in more detail hereinafter). The first secondary winding 24b is polarized to produce a turn-on current (a current in this secondary in the direction to turn the solid state switch 18 on) for the first solid state switch 18 when the voltage at the inverter output junction 22 has a positive shift in voltage. After the first solid state switch 18 is turned on, the current in the first secondary 24b thereafter rapidly decays to zero, this decay in current in the first secondary winding 24b causing turn-off of the first solid state switch 18 and this turn-off of the first solid state switch 18 producing a negative shift in voltage at the inverter output junction 22. The second secondary winding 24c is polarized to produce a turn-on current for the second solid state switch 20 when the voltage at the inverter output junction 22 has this negative shift in voltage. After the second solid state switch 20 is turned on, the current in the second secondary 24c rapidly decays to zero. The decay in current in the second secondary winding 24c causes turn-off of the second solid state switch 20. This turn-off of the second solid state switch 20 produces a positive shift in voltage at the inverter output junction 22, which initiates turn-on of the first solid state switch 18.

The frequency of the foregoing inverter action is predetermined by the design of the feedback means, including the value of the resistor 26, the winding ratios of the primary 24a and the secondaries 24b, 24c and the coupling therebetween. A 20 kHz operating frequency was obtained, for example, when the air-core transformer had a 1400 turns of number 35 wire primary 24a and two 30 turns of number 26 wire secondaries 24b, 24c all wound on a 1 inch O.D. by 1 inch long bobbin, and used with the 10K series resistor 26. The circuit configuration was as shown in FIG. 3. The solid state switches 18, 20 used were Delco DTS-423 power transistors and the capacitors 28 were 350 microfarads at 250 working volts DC. Capacitors in the range of 100 to 1,000 microfarads can be used. Operating frequencies in the range of 17 to 30 kHz can use air-core transformers with primary 24a to secondary 24b, 24c turns ratios of from about 10:1 to 400:1.

The current in the secondary decays in an approximately linear manner because voltage at the inverter output terminal 22 and thus effectively across the resistor 26 and the primary of the air-core transformer 24a is essentially a square wave. The voltage at the inverter output terminal 22 alternates between a voltage very close to voltage at the positive terminal 48 and a voltage approximately the voltage of the negative terminal 46. When the first solid state switch 18 is switched on, for example, the current introduced into the base 19b of this solid state switch 18 by the first secondary of the air-core feedback transformer 24b goes to a relatively high value but begins to decrease (as the rate of change of flux linkage in this secondary drops) in an approximately linear fashion. The value of the current into the base 19b falls below the base-emitter drop and is actually coming out of the base (of an NPN transistor) during the storage time of the solid state switch. At the end of the storage time the first solid state switch 18 turns off and the voltage at the inverter output junction 22 starts to shift (away from the voltage of the positive rectifier terminal 48). The current in the air-core feedback transformer primary 24a now changes and causes a current (by means of the other secondary 24c) into the base of the second solid state switch 21b, turning this solid state switch 20 on and causing the voltage at the inverter output terminal 22 to continue to shift towards the voltage of the negative rectifier terminal 6. It will be noted that the directions of the windings on the air-core transformer primary 24a and secondaries 24b, 24c are such that the air-core transformer is polarized to provide the aforementioned switching action. The polarization is indicated in the conventional manner by the dots marked on the winding, as shown, for example, in FIG. 2.

Thus it can be seen that the feedback device comprising an air-core transformer provides inverter action wherein a solid state switch is held on for a period of time but starts to shut off when the approximately linearly decreasing feedback current passes through zero and actually shuts off a short time thereafter. Thus it is the actual shut-off (rather than the time at which the device receives the shut-off signal) which initiates turn-on of the opposite solid state switch. It is this feature of using the actual shut-off of one solid state switch to initiate turn-on of the other solid state switch which together with the tight coupling of the air-core voltage transformer that does not allow the current coming out of the base of one solid state switch to initiate turn-on of the other solid state switch, which prevents shoot-through. The use of an air-core transformer also permits higher frequency operation, which allows the use of smaller series inductors and capacitors and provides higher efficiency.

The inverter is preferably operated between about 17 kHz and 30 kHz. Below 17 kHz there is a problem of audio noise generation and above 30 kHz, with present transistors, switching losses become excessive.

While NPN transistors have been shown as the solid state switches 18, 20 in the specific embodiment, PNP transistors or gate controlled switches, for example, can also be used.

A capacitor means is preferably used as the isolation means 28. The capacitor means is connected to a circuit output terminal 43 and the capacitor means and circuit output terminal 43 are connected in one of two circuit arrangements as follows: the capacitor means connected between the inverter output junction 22 and the circuit output terminal 42, and the ballasted lamps adapted to be connected between the circuit output terminal 43 and one of the rectifier terminals 46 or 48;

or the capacitor means connected between at least one of the rectifier output terminals 46, 48 and the circuit output terminals 43, and the ballasted lamps adapted to be connected between the circuit output terminal 43 and the inverter output junction 22.

In either configuration the capacitor or capacitors have a predetermined capcitance which is large enough that the voltage or voltages remain substantially unchanged (during operation) at about one-half the peak-to-peak output voltage of the inverter (which is also about one-half the voltage between the positive and negative terminals of the rectifier means 48,46).

We claim:

1. A low cost circuit utilizing a two-transistor inverter with a feedback air-core transformer to provide high-frequency operation of a load comprising ballasted discharge lamps, said circuit comprising:

a rectifier means having positive and negative output terminals, and input terminals adapted to be connected to an AC power source;
   b. first and second solid state switches connected in series directly between said positive and negative output terminals, said first solid state switch being connected to said positive output terminal of said rectifier means and said second solid state switch being connected to said negative output terminal of said rectifier means;
   c. a junction connected to the common connection between said first and second solid state switches, said junction and at least one of said positive and negative output terminals adapted to be connected to said load to transfer high-frequency power thereto; and
   d. feedback means comprising a resistor and an air-core transformer, said air-core transformer having a primary winding and a first secondary winding and a second secondary winding;
      i. said resistor and said primary winding being connected in series relationship, and said series-connected resistor and primary winding effectively connected in parallel with said load with a voltage shift at said junction producing a change in current in said primary winding;
      ii. said first secondary winding being connected to said first solid state switch, a change in current in said primary winding on a positive shift in voltage at said junction providing in said fisrt secondary winding an electrical signal which rapidly decays, said signal in first secondary first turning on said first solid state switch and then turning off said first solid state switch, and said turn-off of said first solid state switch producing a negative shift in voltage at said junction; and
      iii. said second secondary winding connected to said second solid state switch, a change in current in said primary winding on said negative shift in voltage at said junction providing in said second secondary winding an electric signal which rapidly decays, said signal in said second secondary first turning on said second solid state switch and then turning off said second solid state switch, and said turn-off of said second solid state switch producing a positive shift in voltage at said junction to continue the inverter action, and said rapid decays in electric signals in said secondary windings providing high-frequency operaton.

2. A circuit for improved operation of ballasted discharge lamps, said circuit comprising:
   a. a rectifier means having an electrically positive output terminal, an electrically negative output terminal, and input terminals adapted to be connected to an AC power source;
   b. inverter means comprising a first solid state switch having a collector, a base and an emitter; a second solid state switch having a collector, a base, and an emitter; and feedback means for switching said solid state switches;
   c. said first solid state switch and said second solid state switch connected in series relationship between said positive output terminal and said negative output terminal, with said first solid state switch connected to said positive output terminal of said rectifier means, and said second solid state switch connected to said negative output terminal of said rectifier means, and the junction connection of said first solid state switch and said second solid state switch providing an inverter output junction;
   d. at least one electric load comprising a series combination of at least one reactive electrical component and discharge lamp;
   e. an isolating means, said isolating means being connected in series with said load, said series combination of isolating means and load being connected between said inverter output junction and one of said output rectifiers terminals;
   f. said feedback means of said inverter comprising an air-core transformer having a primary winding and a first secondary winding and a seocnd secondary winding, and a resistor connected in series with said primary winding of said air-core transformer and said series-connected primary and resistor being connected effectively in parallel with said load, said first secondary winding connected between said base and said emitter of said first solid state switch, and said second secondary winding connected between said base and said emitter of said solid state switch, said first secondary winding and said second secondary winding polarized to control the inverter action of said circuit as follows;
      i. said first secondary being polarized to produce a turn-on current for said first solid state switch when the voltage at said inverter output junction has a positive shift in voltage;
      ii. after said first solid state switch is turned on, said current in said first secondary winding, thereafter rapidly decays to zero, the decay of current in said first secondary winding causing said first solid state switch to turn off, said turn-off of said first solid state switch then producing a negative shift in voltage at said inverter output junction;
      iii. said second secondary winding polarized to produce turn-on current for said second solid state switch when the voltage at the inverter output junction has said negative shift in voltage;
      iv. after said second solid state switch is turned on, said current in said second secondary winding rapidly decaying to zero, and the decay of current in said second secondary winding causing said second solid state switch to turn off, said turn-off of said second solid state switch then producing a positive shift in voltage at said inverter output junction and initiating turn-on of said first solid state switch, v. the frequency of the foregoing inverter action being predetermined by the design of said feedback means including the value of said resistor, winding ratios of said primary and said secondaries and the coupling therebetween.

3. The circuit as specified in claim 2 wherein a starting means is connected between the base and the emitter of one of the solid state switches to initiate oscillations.

4. The circuit as specified in claim 3 wherein said load comprises a capacitor, an inductor, and a discharge lamp in series, the series resonance of said capacitor and said inductor being higher than the frequency at which said first and said second solid state switches oscillate, such that switching losses in said first and said second solid state switches are reduced.

5. The circuit as specified in claim 4 wherein said load comprises at least one portion, each load portion comprising a major reactive element in series with a parallel combination of at least two load segments, each load segment comprising a discharge lamp and a reactive component of a type opposite that of said major reactive component of that load portion.

6. The circuit as specified in claim 5 wherein said discharge lamps are fluorescent lamps having filaments, and said filaments are powered from secondaries of an air-core filament transformer, said air-core filament transformer having a primary connected effectively in parallel with said load.

7. The circuit as specified in claim 2 wherein said isolation means is a capacitor provided in series with said load, one terminal of said series combination of said capacitor and said load being connected to said inverter output junction, and the other terminal of said series combination of said capacitor and said load being connected to either said positive output terminal or said negative output terminal.

8. The circuit as specified in claim 2 wherein said isolation means comprises two capacitors, connected in series between said positive terminal and said negative terminal of said rectifier and one terminal of said load is connected to said inverter output junction and the other terminal of said load is connected to the common connection point of said two capcitors, such that the capacitors serve not only as isolation means, but also as filter capacitor for said rectifier means.

9. A circuit for improved operation of ballasted discharge lamps, said circuit comprising:
   a rectifier means having an electrically positive output terminal, an electrically negative output terminal, and input terminals adapted to be connected to an AC power source;
   b. inverter means comprising a first solid state switch having a collector, a base and an emitter; a second solid state switch having a collector, a base and an emitter; and feedback means for switching said solid state switches;
   c. said first solid state switch and said second solid state switch connected in series relationship with said fist solid state switch connected to said positive output terminal of said rectifier means, and said second solid state switch connected to said negative output terminal of said rectifier means, and the junction connection of said first solid state and said second solid state switches providing an inverter output junction;
   d. capacitor means connecting to a circuit output terminal, said capacitor means and output terminal connected as follows:
      said capacitor means connected between at least one of said rectifier output terminals and said circuit output terminal, and said ballasted lamps adapted to be connected between said circuit output terminal and said inverter output junction; and
   said capacitor means having predetermined large capacitance sufficient that, during operation of said circuit arrangement, the voltage or voltages across said capacitor means remain substantially constant at about one-half the peak-to-peak output voltage of said inverter means;
   e. said feedback means of said inverter comprising an air-core transformer having a primary winding and a first secondary winding and a second secondary winding, and a resistor connected in series with said primary winding, said series-connected resistor and said primary winding connected effectively across said termials adapted to be connected to said ballasted discharge lamps, said first secondary winding connected between said base and said emitter of said first solid state switch, and second secondary winding connected between said base and said emitter of said second solid state switch; said first secondary winding and said second secondary winding polarized as follows to control the inverter action of said circuit:
      i. said first secondary winding polarized to produce a current in said first secondary in the direction to turn on said first solid state switch when the voltage at said inverter output junction has a positive shift in voltage;
      ii. after said first solid state switch is turned on, said current in said first secondary winding thereafter rapidly decreases to zero, and the decay of current in said first secondary winding causing said first solid state switch to turn off,
      iii. said second secondary winding polarized to produce a current in said second secondary winding in the direction to turn on said second solid state switch when the voltage at said inverter output junction has a negative shift in voltage, the turn-off of said first solid state switch causing said negative shift in voltage at said inverter output junction and inducing turn-on of said second solid state switch;
      iv. after said second solid state switch is turned on, said current in said second secondary winding rapidly decaying to zero, and the decay of current in said second secondary winding causing said second solid state switch to turn off; and
      v. the frequency of the foregoing inverter action being predetermined by the design of said feedback means including the value of said resistor, winding ratios of said primary and said secondaries and the coupling therebetween.

* * * * *